Patented July 15, 1930

1,770,799

UNITED STATES PATENT OFFICE

PAUL O. NOBLE, OF FORT WAYNE, INDIANA, AND JOHN A. CAPP, OF SCHENECTADY, NEW YORK, ASSIGNORS TO GENERAL ELECTRIC COMPANY, A CORPORATION OF NEW YORK

ARC-WELDING ELECTRODE AND PROCESS OF MAKING THE SAME

No Drawing.  Application filed April 15, 1927.  Serial No. 184,173.

Our invention relates to electric arc welding, and particularly to improvements in electrodes for electric arc welding by the metallic arc process, and improvements in the process of manufacturing such electrodes.

In the metallic arc welding process, an arc is drawn and maintained between a metallic pencil, constituting one electrode, and the work, constituting the other electrode. The metal of the electrode is fused or vaporized, or both, and deposited upon the work, and intimately united therewith. The quality of the weld metal depends upon the steadiness with which an arc may be maintained, and this in turn is affected by the composition of the electrode and the presence therein, or thereon, of elements having arc-sustaining properties. A mild steel rod, as it comes from the rolling mills, may or may not operate satisfactorily as an arc welding electrode. We observed that practically all welding wire which operated well had some sort of film on its surface. One grade of wire which operated particularly well seemed to have nothing on the surface except a tight film of a bluish or black color, which is principally iron oxide. The removal of this film by abrasion, as for example by polishing with emery cloth, made it very much more difficult to use the wire as an arc welding electrode. This would appear to indicate that the welding qualities of electrode wire could be improved by deliberately producing a coating of oxide film thereon. We found however that the welding qualities of a wire which had been made clean and bright were improved very little, if to any extent, by heating them in air to produce thereon a thin coating of oxide. The same negative results were secured by heating the wires in steam vapor to produce a similar surface condition. The suitability of the wire for welding therefore we believe is not dependent upon the oxide coating, but upon the presence of a small amount of some element therein having properties particularly beneficial from the standpoint of maintaining a suitable welding arc. The fact that small quantities of certain elements or compounds on the electrode have a very great influence upon the success of the welding operation is disclosed in Letters Patent to Clarence V. Elliott, No. 1,294,250, patented February 11, 1919, and assigned to the same assignee as the present application.

Where high speed steel is to be deposited by the electric arc process, a high speed steel electrode is used, and the difficulties of maintaining an arc, and depositing metal of suitable quality, are very much greater than where a mild steel electrode is used.

An object of our invention is to provide a process of treating welding wire to prepare it for arc welding which process shall be simple and inexpensive, which may be practiced under conditions that may be duplicated with certainty, and which shall insure results that may be relied upon. A further object of our invention is to produce a welding electrode having all of the advantages of ordinary bare electrode wire as distinguished from flux-coated electrodes of either the thickly coated type or the very thinly coated type.

Some of the advantages of ordinary bare electrode wire are that it is clean to handle; no particular care is required in shipping or handling it, as there is no coating thereon which may be flaked or rubbed off, or otherwise injured; and it may be clamped in an electrode holder to lead current into it at any point along its length, and may be used in automatic arc welding machines which use rollers to feed the electrode and generally use rollers, brushes or the like to lead current into the electrode as it moves. An electrode which is provided with a heavy slag coating or a thin coating of an enamel-like insulating character may be injured by handling or bending, so as to break or flake off the coating, and the coating prevents a satisfactory electrical contact between the electrode and the holder or other means for leading current into the electrode. Such an electrode is also not adapted to be passed between feeding rollers, which by their gripping action upon the electrode damage the coating. Electrodes which are provided with a thin surface coating as typified for example by an electrode dipped in a thin lime solution, are apt to have the efficiency of the coating reduced or destroyed by reason of the fact that the coating is easily rubbed off.

In accordance with our invention, we subject the welding wire to treatment in a bath of fused salts which impart to the wire characteristics suitable for arc welding. We have taken bright, clean electrode wires of both mild steel and high speed steel which were unsuitable for welding, and have made them into perfectly successful electrodes by immersing them in a bath of fused sodium nitrate for a time sufficient properly to affect the surface of the material. We have found that maintaining the wire in the bath at a temperature of about 450 degrees C. for approximately one hour is adequate for the purpose. Longer periods of immersion than one hour at such temperature appear to produce no material improvement.

Sodium nitrate when fused is a fairly active oxidizing agent. It is used commercially principally as a bath in which to immerse fully-hardened steel articles to temper them. The use of a bath for this purpose enables great uniformity of control of temperature and duplication of treatment. Sodium nitrate melts at a temperature as low as 300 degrees C. Temperatures higher than 450 degrees C. can be used, but at the higher temperatures the rate of oxidation begins to be so great that the surface of the steel is attacked more rapidly, and care must be used not to damage the surface of the electrodes if the higher temperatures are used to shorten the time of immersion. The surface of the sodium nitrate bath is clean, so that there is no scum which adheres tightly to the electrode when it is removed from the bath. Moreover, the specific gravity of the bath is such that steel articles will not float therein, which makes it unnecessary to provide means for holding the electrodes submerged.

We prefer to wash the electrode wire with hot water upon its removal from the bath, to remove any of the salt which adheres to and crystallizes upon the surface of the wire. The wire is preferably washed as soon as it is removed, and the hot electrode dries quickly. The removal of the salt by washing in hot water is desirable to prevent further rusting, which would be apt to take place by reason of the salt adhering to the surface of the wire.

The bath treatment apparently removes gases which are present in the pores of the wire, and it is apparent that the pores of the wire become impregnated from the bath. The thin film of oxide produced upon the wire by the bath treatment is so thin that it does not deleteriously affect the weld metal that is deposited during welding, as it is affected where too great an amount of oxide is present on a welding wire. That the pores of the wire are impregnated to a certain extent is indicated by the fact that the removal of the thin oxide film by polishing does not destroy the effectiveness of the bath treatment. In fact, we have observed that the welding characteristics of the wire are sometimes improved to a further slight extent by removing this film, although the clean, bright, untreated wire is unsatisfactory for welding. The thin oxide film is however not objectionable from the standpoint of welding, and it is advantageous from the standpoint of protecting the wire from rust during handling and shipment. The oxide film adheres very tightly to the wire, and is not readily flaked off by bending, but even if it should be removed in spots by rough treatment, this will not injure the welding qualities of the wire, for the reason that it may be entirely removed without hurting the wire for welding purposes, as has just been pointed out.

We have obtained equally successful results by treatment in a fused bath of potassium nitrate and by treatment in a fused bath of calcium nitrate. The potassium nitrate bath may be satisfactorily used at a temperature of approximately 450 degrees C. The melting point of calcium nitrate is about 525 degrees C. We have obtained successful results with the calcium nitrate bath at 600 degrees C.

It will be apparent that our invention is not limited to any particular temperature of the bath, nor any particular length of immersion in the bath. It is very easy to select that temperature and time of treatment which give efficient results, since the temperature is under definite control, as is also the time of submersion, and no refinements are necessary to carry out the process to secure the desired result. It is also apparent that a bath of mixed salts may be used.

While as above indicated a thin film of oxide is produced upon the electrode by our bath treatment, our demonstrations lead us to believe that it is not the oxide which produces the beneficial results, from the standpoint of arc maintenance and the successful operation of the wire to deposit sound metal. Sodium, potassium and calcium all have a powerful action as arc stabilizers. It is apparent that only minute quantities of such elements are sufficient for the purpose. An electrode made by our process has the necessary characteristics to make it operate successfully, but the electrode is substantially free from materials which may be chemically or mechanically incorporated in the weld metal so as to affect its character deleteriously.

To insure that the electrode wire, when treated, shall contain only definitely known elements on or in its surface layers, it is desirable to clean the wire as it comes from the mill, before subjecting it to our bath treatment. We have found however that welding wire which has relatively poor welding characteristics may generally be improved by subjecting it to the bath treatment without first making the wire clean and bright.

It is apparent that the bath treatment may be applied to electrode wire either in short lengths or in coils containing many feet of electrode wire.

It will be apparent to those skilled in the art that our invention may be carried out by a continuous process where the wire is in long lengths. For example, the wire may travel slowly through the bath and then be subjected to washing by hot water, and then be dried and wound onto reels. Where the wire is to be made clean and bright before treatment, it may pass through suitable polishing means before it enters the bath.

While in accordance with the patent statutes we have described certain ways of carrying out our process, and have described certain constituents of the bath which we have found to be satisfactory, it will be apparent to those skilled in the art that modifications and substitutions may be made without departing from our invention, and we therefore aim in the appended claims to cover all those changes and variations which fall within the true spirit and scope of our invention.

What we claim as new and desire to secure by Letters Patent of the United States is:

1. The process of preparing an electrode for metallic arc welding which comprises passing a wire of electrode material through a hot bath comprising a fused salt having arc-sustaining properties and adapted to be incorporated in the surface of the wire when treated in said bath.

2. The process of preparing an electrode for metallic arc welding which comprises immersing a wire of electrode material in a bath of fused sodium nitrate.

3. The process of preparing an electrode for metallic arc welding which comprises cleaning a wire of electrode material, then immersing the wire in a hot bath of a fused salt having arc-sustaining properties and adapted to be incorporated in the surface of the wire when treated in said bath, then washing the wire to remove any salt adhering to the surface.

4. The process of preparing an electrode for metallic arc welding which comprises impregnating the pores of the metal adjacent the surface of the wire with a nitrate of an alkaline metal having arc-sustaining properties.

5. The process of preparing an electrode for metallic arc welding which comprises immersing a wire of electrode material in a hot bath of a nitrate of an alkaline metal having arc-sustaining properties.

6. An arc welding electrode comprising a ferrous metal having a thin adherent film of iron oxide thereon, and having the pores of the metal adjacent the surface impregnated with a nitrate of a metal of the group consisting of the elements sodium, potassium and calcium.

7. An arc welding electrode comprising a ferrous metal and a nitrate of an alkaline metal having arc-sustaining material incorporated into the body of the surface layers of the metal.

8. The process of preparing an electrode for metallic arc welding which comprises immersing a wire of electrode material in a bath of fused nitrate salt of metal of the group consisting of the elements sodium, potassium and calcium.

In witness whereof, we have hereunto respectively set our hands the 12th day of April, 1927, and the 11th day of April, 1927.

PAUL O. NOBLE.
JOHN A. CAPP.